Jan. 21, 1930. H. S. HELE-SHAW ET AL 1,744,510
EDGE FILTRATION
Filed Nov. 30, 1925
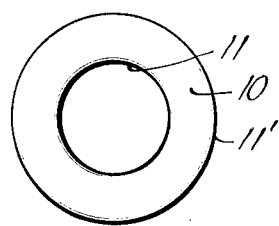
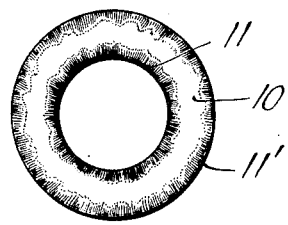
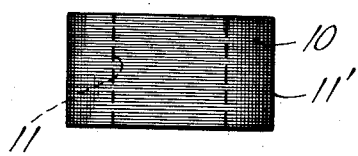
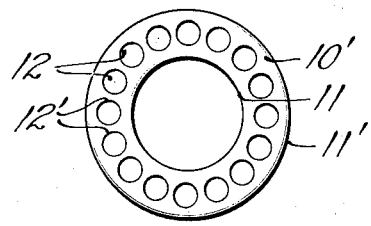
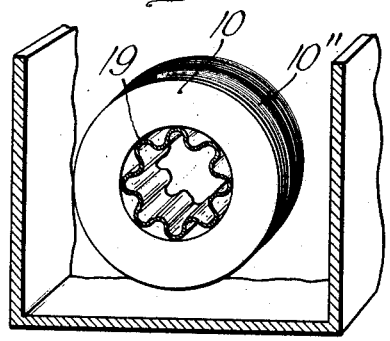
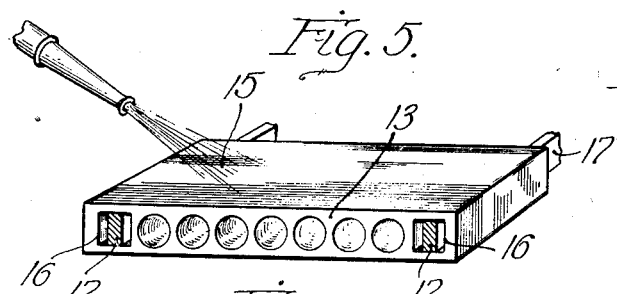
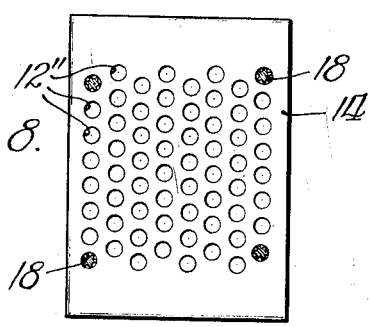
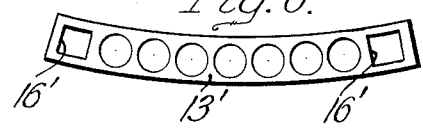
*Inventors:*
Henry Selby Hele-Shaw
Joseph Allen Pickard
By Brown, Jackson, Boettcher & Dienner
Attys.

Patented Jan. 21, 1930

1,744,510

UNITED STATES PATENT OFFICE

HENRY SELBY HELE-SHAW AND JOSEPH ALLEN PICKARD, OF LONDON, ENGLAND

EDGE FILTRATION

Application filed November 30, 1925, Serial No. 72,108, and in Great Britain December 17, 1924.

This invention relates to paper for use in edge filtration or like apparatus.

In the filtering or separating methods set forth in specifications of British Patents Nos. 210,101, 210,376 and 227,890, amongst the papers employed is cellulose of sufficiently roughened surface to allow the passage of the fluid from which suspended matter is to be separated, whether the fluid is a liquid or a gas. In filtering or separating apparatus made in accordance with claim 1 of specification of British Patent No. 210,101 the condition of the edges of the paper and their proper maintenance are found to have an important bearing on the behaviour of the filter, and the present invention has for its object to provide a paper having edges that will give an efficient filtering or separating action and which can be readily maintained at a high degree of efficiency.

The present invention comprises paper for use in edge filtration or in the separation of fluids or suspended matter therefrom, of which the edges or whole thereof is treated with a suitable material of a nature varying with that of the fluid to be treated for the purpose of increasing its impermeability and resistance to the action of the fluid under treatment, and also of making the edges of the paper of such a consistency that the separated matter deposited thereon can be readily removed without destroying the separating action of such edges.

Figure 1 is a plan view of one form of filter sheet, to which the present invention is applicable;

Figure 2 is a side elevational view of a pile of sheets similar to the sheet of Figure 1 and to which the present invention is applicable;

Figure 3 is a plan view of a filter sheet similar to Figure 1, but after treatment;

Figure 4 is a fragmentary and more or less diagrammatic perspective view in vertical section, showing one manner of treating the filter pile of Figure 2 by immersion;

Figure 5 is a perspective view showing another form of filter pile and one manner of treating the same by spraying; and Figures 6, 7 and 8 illustrate other forms of filter sheets treated according to the present invention.

The paper 10 is preferably cut or otherwise brought to the size and shape required before treatment with a substance that will render such edges 11 when in pack or pile formation readily cleanable, whether the edges be in holes 12 formed through the pack or on the outer surface 11' thereof, the process being equally applicable to annular sheets, strip sheets 13, plain 10 or perforated, 10' or perforated square sheets 14.

The invention may be carried out by immersing or spraying a part or the whole of the sheets 10, for example, taking care that whatever happens to the remainder of the sheet the edges exposed in filtration are treated with the desired material. Amongst other materials for the purposes are:—Nitrocellulose, rubber, celluloid, cellulose esters, resins, hardened gelatine, acetylcellulose, chlorinated rubber, casein, synthetic or natural resin, paraffin, asphaltum, bakelite, and similar formaldehyde condensation products.

These substances are given by way of example, other substances may be used according to the nature of the fluid under treatment, the essential feature of the invention being the treatment of the edges 11 and 12' of the paper by some substance that will retain the edges in working condition for treatment of any particular fluid.

It is well known that the very essence of efficient filtering lies in the removal of the separated matter, and in edge filtration the removal of matter accumulating at the edges 11 and 12, so that the filtering output must fall off as the thickness of the deposited layer increases. What, however, is found to occur with the treatment of the edges in accordance with the present invention, is that instead of the edges 11 and 12′ themselves becoming gradually inefficient in their filtering effect, their efficiency is maintained quite irrespective of the deposit on them, and at the same time allows suspended matter to be removed by scraping or brushing of the edges 11 and 12′ especially when each process is combined with the reversal of direction of flow of the fluid whether that fluid be compressed air or other gas or liquid of the kind being filtered, or any other suitable liquid.

By employing the above described method it is in general quite unnecessary to alter in any way the compression on the pack of sheets in a press when applying the cleaning fluid in the reverse direction as above described. Also packs of sheets so treated facilitate the use of cleaning tools or devices of the exact size and shape necessary to enable them being passed over the treated edges 11 and 12′ whether internal or external.

The treatment of the paper 10 may be effected after the sheets have been arranged in packs or piles 10″ as required in the press or filtering apparatus, and in such case it is desirable to have the filtering edge surfaces, that is the surfaces to be presented to the spraying or dipping operation, as smooth as possible. In the case of a press using annular filter or separating sheets 10, this is easily effected by means of fluted tubes 19. In the case of strip packs 15 provision can with advantage be made for expansion or contraction in the direction of length. In the case of strips as shown in British patent specification No. 227,890 the end perforation 16 of the strip packs 15 can be made square and guides 17 employed of rectangular shape, the long side of the rectangle being of such length that the whole rectangle fits into the square, having the short side of the rectangle parallel with the length of the strip, and the long side of the rectangle parallel with the breadth of the strip. Thus while contraction or expansion takes place a perfectly smooth surface is always presented to the spraying or dipping action above described, and it is possible to scrape or brush the smooth surfaces thus treated so as to entirely clean off the cake or layer of deposited material.

In the case of the square perforated sheet 14 as described in British patent specification No. 210,101 the filtering is done through the tubular holes 12″ and it is only necessary in this case to keep these holes in alignment with each other by fluted rods 18, so that the tubes remain smooth and can be washed clean of deposited material.

What we claim and desire to secure by Letters Patent is:—

A filter for use in filtration by surface contact only comprising a plurality of sheets of paper having a roughened surface, said sheets having their edges only treated with a material impermeable and resistant to the action of the fluid to be filtered to increase the impermeability and resistance of said edges to the action of the fluid, and to increase the consistency of said edges so that separated matter deposited thereon can be readily removed without destroying the separating action of the filter.

In witness whereof we affix our signatures.

HENRY SELBY HELE-SHAW.
JOSEPH ALLEN PICKARD.